May 22, 1962     A. E. MLECZKO ETAL     3,035,856
LOAD LEVELER ADJUSTABLE TRAILER HITCH BAR
Filed Feb. 15, 1960
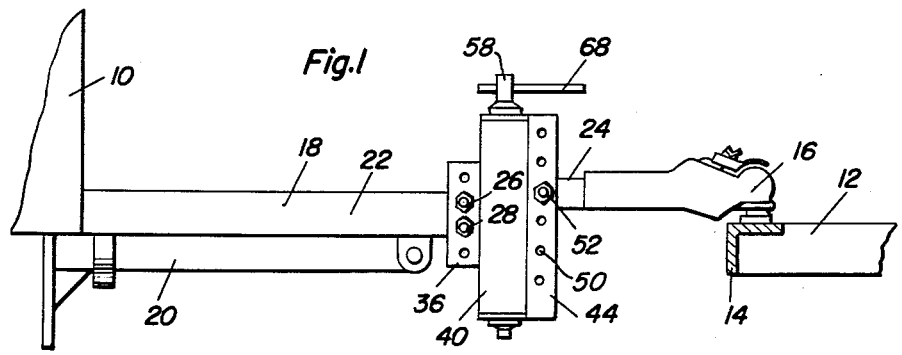
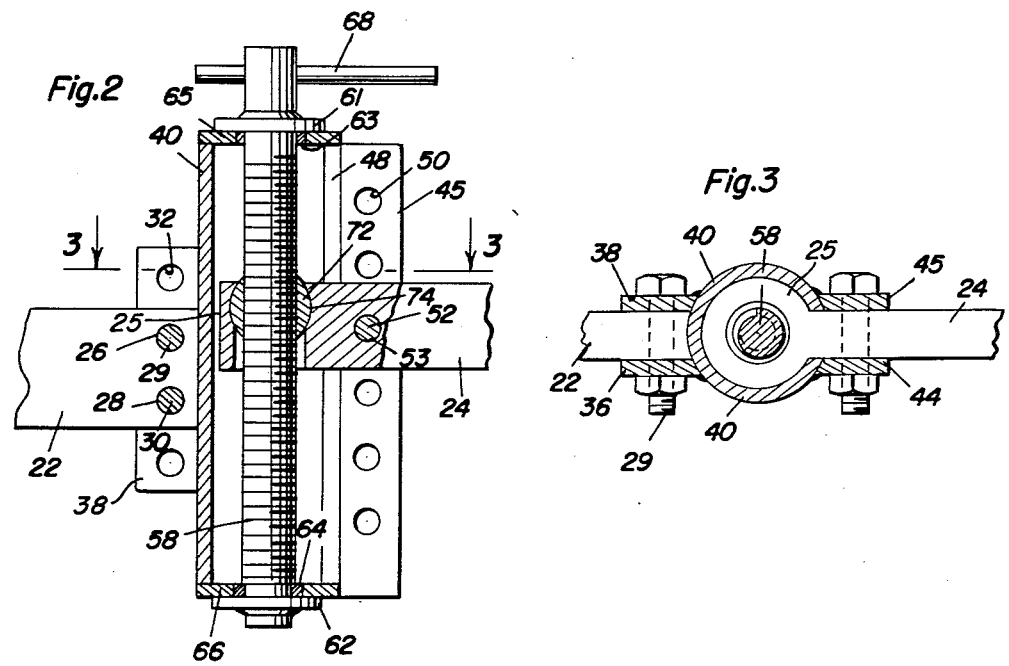
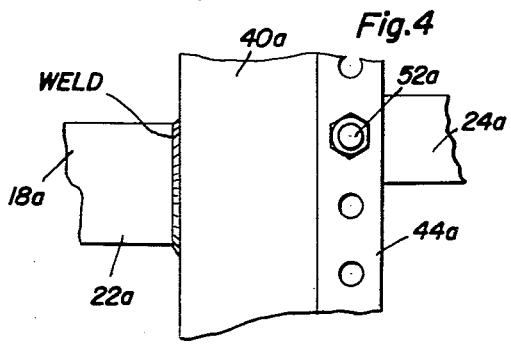
Alexander E. Mleczko
Roger A. Grimh
           INVENTORS United States Patent Office 3,035,856
Patented May 22, 1962

3,035,856
LOAD LEVELER ADJUSTABLE TRAILER
HITCH BAR
Alexander E. Mleczko and Roger A. Grimh,
Radisson, Wis.
Filed Feb. 15, 1960, Ser. No. 8,674
9 Claims. (Cl. 280—490)

This invention relates to the art of coupling driving and drawn vehicles and more particularly to a load leveler adjustable trailer hitch bar.

An object of the invention is to provide a new adjustable trailer hitch bar for leveling between a traction and drawn vehicle, regardless of the type of traction vehicle and drawn vehicle.

A more particular object of the invention is to provide a manually adjustable load leveler bar which is practical in use and which serves its intended purpose very effectively. Only one manual adjustment is required to raise or lower the trailer hitch bar section that is isolated from the other section in practice of this invention.

The invention is especially designed to be used with center suspended trailers, although the principles of the invention are applicable to other types of equipment. The function of the invention is to obtain a level condition of the trailer body with an uneven load distribution regardless of the hitch point of the pulling vehicle. One of the results achieved by the invention, apart from the leveling mentioned above, is that the invention facilitates the use of a trailer stand which sometimes poses a problem with conventional trailer hitch equipment.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIGURE 1 is a fragmentary elevational view of a towing and drawn vehicle with the load leveler adjustable trailer hitch bar interposed therebetween.

FIGURE 2 is an elevational view of the hitch bar sections adjusting means of the invention, parts being broken away in section to show internal detail.

FIGURE 3 is a transverse sectional view taken on the line 3—3 of FIGURE 2.

FIGURE 4 is an enlarged fragmentary elevational view showing a modification.

In the accompanying drawings there is shown a bracket 12 to be mounted on the rear end of a tractor or motor vehicle, said bracket including a bar 14 on which the usual upstanding ball of a conventional hitch 16 is mounted. Hitch bar 18 is connecetd to a trailer 10 in the conventional way, and it has a conventional pivoted stand 20 beneath it. The same is true of the trailer hitch 16.

Hitch bar 18, although conventionally secured to the trailer 10 is made in inner and outer sections 22 and 24 with the section 24 having the trailer hitch 16 secured to it. In the embodiment of FIGURES 1–3 the hitch bar section 22 has a pair of holes 26 and 28 through which bolts 29 and 30 are passed. These bolts are passed through selected apertures in the group 32 of apertures formed in parallel plates 36 and 38 (FIG. 3). A housing 40 has parallel plates 36 and 38 welded or otherwise secured to it, and there is a second pair of parallel flanges or plates 44 and 45 that are fixed to housing 40 on opposite sides of slot 48 therein. This slot runs the full length of the vertical cylindrical housing 40 and is adapted to accept and receive section 24 of the hitch bar 18. Plates 44 and 45 each has a group 50 of apertures in them, and there is at least one aperture in the section 24 of hitch bar 18 so that safety bolt 52 may be passed through the selected apertures in the groups 50 and through the aperture 53 in section 24.

A screw 58 extends longitudinally axially through housing 40 and has upper and lower thrust bearings 61 and 62 attached near the ends thereof. The screw is mounted for rotation in bearings 63 and 64 that occupy the openings in the upper wall 65 and the lower wall 66 of cylindrical housing 40. A hand operated lever or handle 68 is attached to the upper end of screw 58 to facilitate rotating the screw. The screw 58 passes through a ring 25 on the inner end of the section 24. There is means drivingly connected between the screw 58 and section 24 of the hitch bar 18 for raising and lowering the hitch bar sections with respect to each other. This means comprises a ball 72 which has an internally threaded passage extending through it. The ball is threaded on screw 58 and is in socket 74 in the ring 25 and which is shaped as the intermediate portion of a sphere, holding the ball captive in the said ring to the extent that the ball may rotate slightly, but the fit of the ball in the socket is sufficiently tight to frictionally retain said ball against turning in unison with said screw.

The embodiment of the invention in FIGURE 4 differs from the embodiment of FIGURE 2 by having section 22a of hitch bar 18a welded directly to housing 40a. This omits one adjustment, that is, the adjustment between housing 40 and section 22, but in many applications this adjustment is not necessary. This embodiment of the invention also exemplifies the intention that the invention not be limited to one particular embodiment.

In use and operation, after installation on a tractor vehicle, regardless of its nature, and a drawn vehicle regardless of its nature (usually a trailer) the handling is quite simple. In order to level the traction vehicle and the drawn vehicle after loading the drawn vehicle, the user need only rotate screw 58 and this will elevate or lower the sections 22 and 24 with respect to each other. After assuming the correct disposition of the sections 22 and 24, the safety bolt 52 is applied.

There are numerous uses of the invention that will become immediately apparent to those using trailer hitches and hitch bars for a variety of purposes. The invention is not restricted to such uses as trucking and finds a great utility with amateur boat launching and beaching as well as house trailer use and many others.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer hitch bar comprising an inner section mounted on the trailer, a cylindrical tubular housing mounted vertically on the outer end of said inner section, said housing having a vertical slot therein, a screw journaled vertically in the housing, said hitch bar further comprising a vertically adjustable, horizontal outer sec-section slidable vertically in the slot and retained by the side walls thereof against horizontal swinging movement, a ball journaled for universal movement in the inner end portion of the outer section and threaded on the screw for operatively connecting said screw to said outer section for adjusting same vertically, said outer section frictionally retaining said ball against rotation with said screw, and means for securing said outer section in adjusted position.

2. A trailer hitch bar comprising an inner section mounted on the trailer, a cylindrical tubular housing mounted vertically on the outer end of said inner section, said housing having a vertical slot therein, a screw journaled vertically in the housing, said hitch bar further comprising a vertically adjustable, horizontal outer section operable in the slot, a ball journaled for universal movement in the inner end portion of the outer section and threaded on the screw for operatively connecting said screw to said outer section for adjusting same vertically, said outer section frictionally retaining said ball against rotation with said screw, and means for securing said outer section in adjusted position, said means comprising opposed flanges mounted on the housing on opposite sides on the slot, said flanges having longitudinally spaced openings therein, said outer section having an opening therein registrable selectively with the first-named openings, and a bolt insertable in the registering openings.

3. A trailer hitch bar comprising an inner section mounted on the trailer, a cylindrical tubular housing mounted vertically on the outer end of said inner section, said housing having a vertical slot therein, a screw journaled vertically in the housing, said hitch bar further comprising a vertically adjustable, horizontal outer section operable in the slot and including on its inner end a ring encircling the screw and operable in the housing, said ring having a socket therein, a ball journaled for universal movement in the socket and threaded on the screw for operatively connecting said screw to said outer section for adjusting same vertically, said socket frictionally retaining said ball against rotation with said screw, and means for securing said outer section in adjusted position, said means including opposed flanges mounted vertically on the housing on opposite sides of the slot, said flanges having longitudinally spaced openings therein, said outer section having an opening therein registrable selectively with the first-named openings, and a removable bolt inserted in the registering openings.

4. A trailer hitch bar comprising an inner section mounted on the trailer, a cylindrical tubular housing mounted vertically on the outer end of said inner section, said housing including upper and lower end walls, said housing having a vertical slot therein, vertically aligned bearings mounted in said end walls, a manually operable vertical screw journaled in the bearings and extending centrally through the housing, said hitch bar further comprising a vertically adjustable, horizontal outer section including on its inner end a ring encircling the screw and operable in the housing, said ring having a socket therein, a ball journaled for universal movement in the socket and threaded on the screw for operatively connecting said screw to said outer section for adjusting same vertically, said outer section being slidable vertically in the slot and retained by the side walls thereof against horizontal swinging movement, said socket frictionally retaining said ball against rotation with said screw, and means for securing said outer section in adjusted position.

5. A trailer hitch bar comprising an inner section mounted on the trailer, a cylindrical tubular housing mounted vertically on the outer end of said inner section, said housing including upper and lower end walls, said housing having a vertical slot therein, vertically aligned bearings mounted in said end walls, a manually operable vertical screw journaled in the bearings and extending centrally through the housing, said hitch bar further comprising a vertically adjustable, horizontal outer section operable in the slot and including on its inner end a ring encircling the screw and operable in the housing, said ring having a socket therein, a ball journaled for universal movement in the socket and threaded on the screw for operatively connecting said screw to said outer section for adjusting same vertically, said socket frictionally retaining said ball against rotation with said screw, and means for securing said outer section in adjusted position, said means comprising opposed flanges mounted on the housing on opposite sides of the slot, said flanges paralleling the slot and having longitudinally spaced openings therein, said outer section having an opening therein registrable selectively with the first-named openings, and a bolt mounted in the registering openings.

6. A trailer hitch bar comprising an inner section mounted on the trailer and having vertically spaced openings in its outer end portion, a cylindrical tubular housing mounted vertically for vertical adjustment on the inner section and comprising a pair of spaced flanges receiving said free end portion of said inner section therebetween, said flanges having vertically spaced openings therein registrable selectively with the first-named openings, bolts engaged in the registering openings for securing the housing in vertically adjusted position on said inner section, said housing including upper and lower end walls having vertically aligned bearings therein, a vertical screw mounted centrally in the housing and journaled in the bearings, said housing having a vertical slot therein, said hitch bar further comprising a vertically adjustable, horizontal outer section slidable vertically in the slot and retained by the side walls thereof against horizontal swinging movement, means operatively connecting the screw to said outer section for adjusting same vertically, and means for securing said outer section in adjusted position.

7. A trailer hitch bar comprising an inner section mounted on the trailer and having vertically spaced openings in its outer end portion, a cylindrical tubular housing mounted vertically for vertical adjustment on the inner section and comprising a pair of spaced flanges receiving said free end portion of said inner section therebetween, said flanges having vertically spaced openings therein registrable selectively with the first-named openings, bolts engaged in the registering openings for securing the housing in vertically adjusted position on said inner section, said housing including upper and lower end walls having vertically aligned bearings therein, a vertical screw mounted centrally in the housing and journaled in the mearings, said housing having a vertical slot therein, said hitch bar further comprising a vertically adjustable, horizontal outer section, means operatively connecting the screw to said outer section for adjusting same vertically, and means for securing said outer section in adjusted position, the first-named means including a ring on the inner end of said outer section operable in the housing and encircling the screw, said ring having a socket therein, and a ball journaled for universal movement in the socket and threaded on the screw and frictionally retained by said socket against rotation with said screw, said outer section being slidable vertically in the slot and retained by the side walls thereof against horizontal swinging movement relative to the inner section.

8. A trailer hitch bar comprising an inner section mounted on the trailer and having vertically spaced openings in its outer end portion, a cylindrical tubular housing mounted vertically for vertical adjustment on the inner section and comprising a pair of spaced flanges receiving said free end portion of said inner section therebetween, said flanges having vertically spaced openings therein registrable selectively with the first-named openings, bolts engaged in the registering openings for securing the housing in vertically adjusted position on said inner section, said housing including upper and lower end walls having vertically aligned bearings therein, a vertical screw mounted centrally in the housing and journaled in the bearings, said housing having a vertical slot therein, said hitch bar further comprising a vertically adjustable, horizontal outer section operable in the slot, means operatively connecting the screw to said outer section for adjusting same vertically, and means for securing said outer section in adjusted position, the second-named means including opposed flanges on the housing on opposite sides of the slot and paralleling said slot, the second-named flanges having longitudinally spaced openings therein, said outer section having an opening therein registrable selectively with the second-named openings, and a bolt engaged in the second and third-named registering openings.

9. A trailer hitch bar comprising an inner section mounted on the trailer and having vertically spaced openings in its outer end portion, a cylindrical tubular housing mounted vertically for vertical adjustment on the inner section and comprising a pair of spaced flanges receiving said free end portion of said inner section therebetween, said flanges having vertically spaced openings therein registrable selectively with the first-named openings, bolts engaged in the registering openings for securing the housing in vertically adjusted position on said inner section, said housing including upper and lower end walls having vertically aligned bearings therein, a vertical screw mounted centrally in the housing and journaled in the bearings, said housing having a vertical slot therein, said hitch bar further comprising a vertically adjustable, horizontal outer section operable in the slot, means operatively connecting the screw to said outer section for adjusting same vertically, and means for securing said outer section in adjusted position, the first-named means including a ring on the inner end of said outer section operable in the housing and encircling the screw, said ring having a socket therein, and a ball journaled for universal movement in the socket and threaded on the screw, said socket frictionally retaining said ball against rotation with said screw, the last-named means including a pair of opposed flanges fixed vertically on the housing on opposite sides of the slot, the second-named flanges paralleling the slot and having longitudinally spaced openings therein, said outer section having an opening therein registrable selectively with the second-named openings, and a bolt removably mounted in the second and third-named openings.

References Cited in the file of this patent

UNITED STATES PATENTS

| | | |
|---|---|---|
| 1,337,521 | Lauer | Apr. 20, 1920 |
| 2,072,473 | Baumberger | Mar. 2, 1937 |
| 2,189,864 | McDaniel | Feb. 13, 1940 |
| 2,534,971 | Henroid | Dec. 19, 1950 |
| 2,847,232 | Graham | Aug. 12, 1958 |
| 2,917,323 | Mandekic | Dec. 15, 1959 |